Feb. 22, 1944. P. W. THORNHILL 2,342,381
LIQUID DAMPED RESILIENT SUSPENSION DEVICE FOR VEHICLES
Filed Feb. 6, 1943 2 Sheets-Sheet 1

Inventor
Peter Warbon Thornhill
By Stevens and Davis
his attorneys

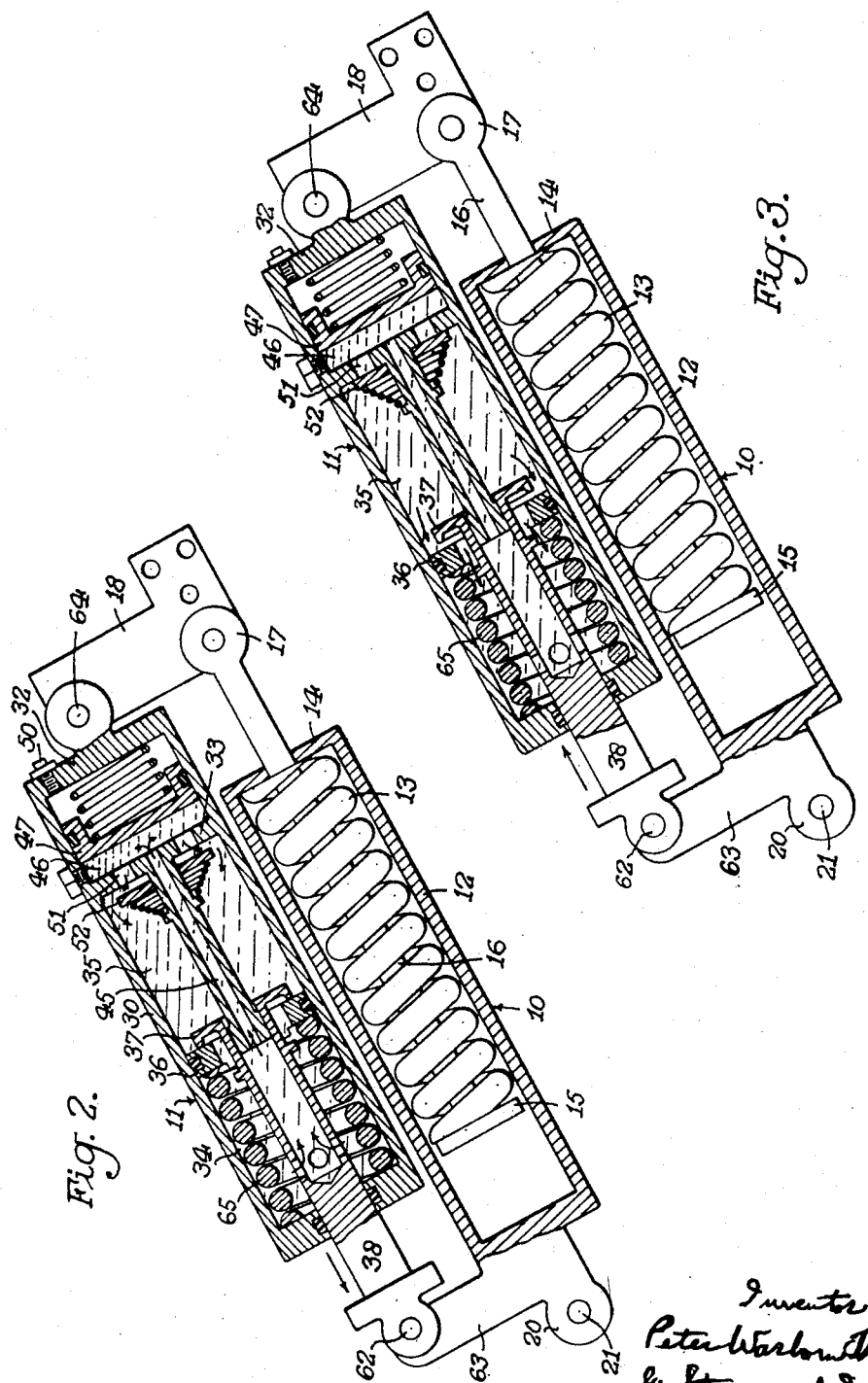

Patented Feb. 22, 1944

2,342,381

UNITED STATES PATENT OFFICE 2,342,381

LIQUID DAMPED RESILIENT SUSPENSION DEVICE FOR VEHICLES

Peter Warborn Thornhill, Leamington Spa, England

Application February 6, 1943, Serial No. 475,024
In Great Britain February 2, 1942

8 Claims. (Cl. 267—34)

This invention relates to liquid damped resilient suspension devices for vehicles.

It is an object of the invention to provide an improved suspension unit embodying a damping device, which latter is of simple construction, but which has very desirable working characteristics.

A further object of the invention is to provide an improved form and construction of damping unit for use in conjunction with a suspension spring of a vehicle in order to produce smooth running.

In a vehicle suspension device comprising a pair of relatively movable members, and main resilient means and auxiliary resilient means which are both stressed simultaneously when said members move relatively as the result of a road shock, so that said means together support the consequent increased load on the device, the present invention is characterised by the provision of a liquid damping device which is arranged to hold the auxiliary resilient means under stress during the recoil movement of the members, and thereby prevent the auxiliary resilient means from assisting the main resilient means during said recoil movement. Preferably the liquid damping means act to oppose the movement of the suspension device during the said recoil movement.

There is further provided according to the invention a vehicle suspension device comprising a pair of relatively movable members, and main resilient means and auxiliary resilient means which are both stressed simultaneously when said members move relatively as the result of a road shock, so that said means together support the consequent increased load on the device, wherein a liquid damping device is provided and comprises a recoil valve which is urged to its closed position by the auxiliary resilient means during the recoil stroke of the suspension device, thereby trapping damping liquid within a substantially closed chamber so that pressure generated in said liquid opposes the recoil movement of the relatively movable members.

As a further aspect of the invention there is provided for use in conjunction with a vehicle suspension spring, a damping unit comprising in combination a pair of members mounted to move telescopically as the loading of the vehicle spring increases and decreases, an auxiliary spring which is stressed by the said members as the vehicle suspension spring is stressed beyond its normal loading due to a road shock, liquid damping means restraining the recoil movement of the members due to the force created upon them by the stress in the auxiliary spring, and a recoil valve device which controls the action of the liquid damping means and is urged to its closed position by the auxiliary spring when the latter is in a stressed condition.

According to another aspect of the invention there is provided for use in conjunction with a vehicle suspension spring a damping unit comprising a cylinder containing damping liquid; a piston device mounted to reciprocate within the cylinder as the loading of the vehicle spring increases and decreases, said piston including a non-return recoil valve arranged to by-pass the piston in one direction; means for by-passing the piston in the opposite direction; and an auxiliary coiled compression spring which is disposed within one end of the cylinder and is arranged to be engaged by the recoil valve, and to be compressed when the vehicle suspension spring is stressed beyond its normal static loading due to a road shock, the compressed auxiliary spring thereby holding the by-pass valve closed until the recoil of the vehicle suspension spring generates in the liquid in the other end of the cylinder, a pressure sufficient to open the recoil valve against the force exerted by the auxiliary spring. The said piston device may comprise a head formed upon a piston rod, which latter is slidable through the end wall of the cylinder, and an annular recoil valve member slidably engaging with the cylinder wall, said valve member being arranged to seat upon the head and form a substantially liquid-tight seal. Preferably the annular recoil valve member is operatively interposed between the auxiliary spring and the head upon the piston rod. A one-way valve may be arranged to by-pass the piston device to allow liquid to flow freely past said device in the direction opposite to that permitted by the recoil valve, said one-way valve controlling the passage of liquid through a partition, which is disposed in the cylinder and has a tubular stem telescopically engaging within a bore in the piston device, thereby connecting together spaces at the remote side of the piston device and the partition respectively.

The invention is illustrated by way of example in the accompanying diagrammatic drawings, in which:

Figure 2 is a fragmentary sectional elevation of the spring and damping units of Figure 1 showing the action which occurs when the wheel strikes a bump in the road surface;

Figure 4:
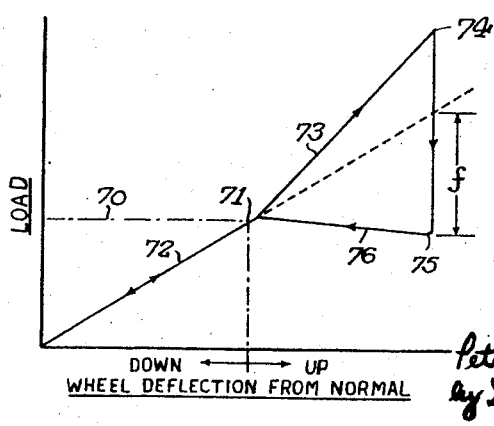

Figure 3 is a view similar to Figure 2, but showing the action of the parts when recoil occurs; and Figure 4 is a graph showing typical characteristics of the suspension device.

Figure 1:
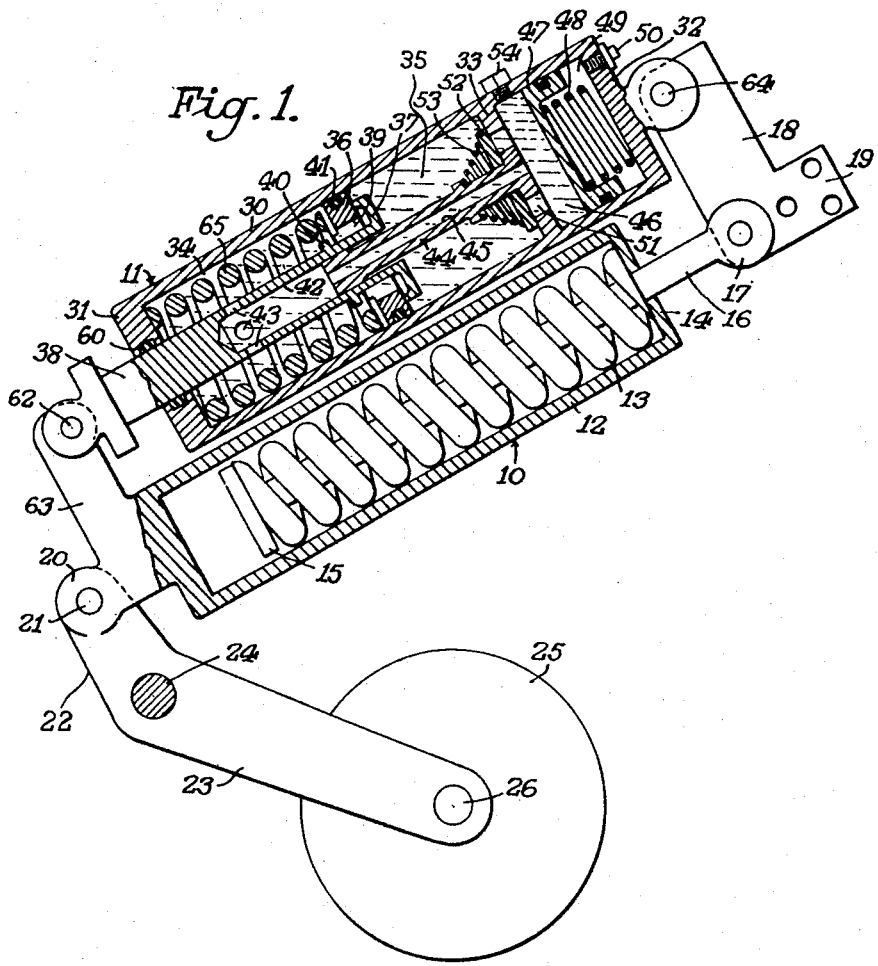
Figure 1 is a side elevation, partly in section, showing one form of wheel suspension device for a vehicle, the parts being in the positions which they occupy when the device is bearing its normal static load.

Referring firstly to Figure 1, the suspension device comprises mainly two telescopic units, namely, a main spring unit indicated at 10 and a damping unit indicated at 11. The former comprises a tubular casing 12 containing a relatively strong coiled compression spring 13 forming the main spring of the suspension, said spring bearing at one end against a closure flange 14 and being arranged at its other end to abut against a head 15 upon a tension rod 16. The latter is slidable through a central hole defined by the closure flange 14 and has at its outer end a lug 17 attached pivotally to a bracket 18, which latter is fastened to the chassis or body of the vehicle, conveniently by means of a perforated extension 19. At its opposite end the tubular casing 12 is closed and is formed with a lug 20, which is pivotally connected at 21 to the arm 22 of a bell-crank lever, the other arm of which is indicated at 23. The bell-crank lever 22, 23 is pivotally mounted upon the vehicle chassis or body at 24 and the outer end of the arm 23 is arranged to carry or control the movement of the vehicle wheel or equivalent. In the arrangement shown diagrammatically in Figure 1 the arm 23 carries a wheel or roller 25, which may be one of the load-supporting wheels or rollers of an endless track vehicle, the axis of the wheel or roller being indicated at 26. It will, of course, be seen that upward movement of the wheel or roller 25 as the result of a road shock causes the bell-crank lever 22, 23 to move angularly in an anti-clockwise direction, thus drawing the tubular casing 12 towards the left and compressing the main spring 13. When the bump or other obstacle has been passed the spring 13 tends to expand and produce the usual recoil, but in the present arrangement such recoil movement is controlled by the damping unit 11, as will be hereinafter explained.

The damping unit 11 comprises a cylinder 30 having end walls 31 and 32, as well as a partition 33 disposed a short distance from the end wall 32. The space between the end wall 31 and the partition 33 constitutes the main working chamber and this is divided into two variable volume working spaces 34 and 35 by means of a piston device comprising an annular recoil valve member 36 acting in conjunction with a head 37 upon a piston rod 38. The recoil valve member 36 has internal radially projecting webs 39 enabling it to slide upon the piston rod 38 between the limits set by the head 37 and a stop flange 40; thus when the valve member 36 moves out of engagement with the head 37, damping liquid (with which the spaces 34 and 35 are filled) can flow past the webs 39 and the head 37. The recoil valve member 36 is fitted with a circumferential packing ring 41, which slides in a liquid-tight manner within the cylinder 30.

Extending from the head 37 the piston rod 38 is formed with a bore 42, which is in permanent communication with the space 34 by means of a series of apertures 43; the bore 42 is also engaged telescopically by an axial stem 44, which is carried by the partition 33 and has a longitudinal passage 45 permanently connecting the space 34 with a reservoir space 46 beyond the partition 33. This space 46 is bounded by a floating piston 47, which latter is urged along the cylinder 30 by a coiled compression spring 48 and also, if desired, by compressed air, which is charged into the space 49 by means of an air valve indicated at 50. That part of the partition 33 surrounding the stem 44 is formed with a series of apertures 51, which are arranged to be closed by an annular damping valve member 52 urged into engagement with the partition 33 by a coiled compression spring 53 bearing at its opposite end against a stop flange upon the stem 44. A plug 54 enables the damping unit 11 to be charged with liquid after assembly or when it is being put into service.

The piston rod 38, which slides in a liquid-tight manner through a packing 60 in the end wall 31, is pivotally connected at 62 to a laterally extending lug 63 formed upon the casing 12 of the spring unit 10, while the end wall 32 of the damping unit 11 is pivotally connected at 64 to the bracket 18 mounted upon the vehicle body or equivalent. Thus the two units 10 and 11 are caused to extend simultaneously by upward movement of the wheel or roller 25 and they similarly contract or shorten during the recoil. When the vehicle wheel or equivalent 25 is bearing its normal static load, however, the spring 13 is of course compressed to a predetermined extent and both units are partly lengthened to correspond, the various components taking up the positions shown in Figure 1.

Disposed within the working space 34 is a coiled compression spring 65, which is herein termed the auxiliary spring and is relatively strong, although it is usually somewhat weaker than the main suspension spring 13. It will be seen that it is adapted to bear at one end against the end wall 31 of the cylinder 30 and at the other end against the recoil valve member 36, but it is so made that its natural or fully extended length is just slightly shorter than the distance between the parts 31 and 36 when the suspension device is bearing its normal static load; however, when the damping unit 11 becomes lengthened the auxiliary spring 65 bears against the recoil valve member 36, thus holding it firmly in its closed position where it engages with the head 37.

The operation of the suspension device is as follows. When the wheel or equivalent 25 is steady and is bearing its normal static load the parts occupy the position shown in Figure 1, as was mentioned above, the auxiliary spring 65 resting loosely and idly within the space 34. Slight upward movements of the wheel or equivalent 25, and downward movements thereof to the maximum permissible extent, can take place without bringing the auxiliary spring 65 into action, the damping liquid being transferred from the space 34 to the space 35 by way of the passage 45 and damping valve 52, and vice versa by way of the recoil valve 36. When, however, the load on the wheel or equivalent 25 is substantially increased, say on account of a bump on the road surface, producing what is herein termed a road shock, then the piston rod 38 of the damping unit 11 is withdrawn to a substantial extent through the end wall 31, and early in this movement the head 37 presses the annular recoil valve 36 firmly into engagement with the auxiliary spring 65. Of course, liquid from the space 34 is then prevented from passing between the recoil valve 36 and the head 37, so that as said space 34 diminishes in volume the liquid rejected therefrom flows through the bore 42, the passage 45, into the reservoir space 46, and thence through the apertures 51 past the damping valve 52, into the space 35, as shown in Figure 2. This flow of liquid provides the requisite amount of damping during the upward movement of the wheel or equivalent 25, the apertures 43 and/or the passage 45 being arranged to be of suitable cross-sectional area for this purpose. The variation in the total volume of the spaces 34 and 35 on account of the cross-sectional area of the piston rod 38 is taken care of by the floating piston 47, which freely accommodates itself to the quantity of liquid which is present in the reservoir space 46. It is to be particularly noted that during substantial upward movements of the wheel or equivalent 25 said upward movements are resisted resiliently by the main spring 13 and the auxiliary spring 65 working in combination, the resistance to movement experienced by the upper end of the arm 22 being substantially equal to the sum of the two forces exerted by the main spring 13 and the auxiliary spring 65 respectively.

When the extension of the suspension device ceases the total force exerted by the springs 13 and 65 is, of course, more than is necessary to support the normal static load due to the weight of the vehicle, and therefore both springs 13 and 65 begin to expand, thus commencing the recoil stroke of the device. However, the damping liquid within the space 35 is trapped, as it cannot escape through the apertures 51, the damping valve member 52 being held closed by the liquid pressure. Its only way of escape, therefore, is past the recoil valve member 36, which is being held firmly closed on account of the force exerted by the auxiliary spring 65. The recoil of the main suspension spring 13 is therefore considerably retarded, firstly because the force which it exerts has to operate on the piston device 36, 37 so as to generate, in the liquid disposed within the space 35, a pressure which is sufficient to move the recoil valve 36 away from the head 37 against the action of the auxiliary spring 65; and secondly owing to the fact that it has to operate alone instead of in company with the auxiliary spring 65, which assisted it during the previous extension of the device. When, of course, the requisite pressure is developed within the space 35, some of the liquid from said space escapes past the valve 36 into the space 34, thereby allowing the piston rod 38 to move further into the cylinder 30; as this movement proceeds the force exerted by the auxiliary spring 65 progressively decreases, thus diminishing the damping effect exerted upon the action of the spring 13 by the liquid in the space 35 until the position shown in Figure 1 is regained, when the damping effect of the liquid is substantially zero.

The general characteristics of a suspension device of the form shown in Figures 1 to 3 are approximately indicated by the graph in Figure 4, in which the load is plotted against the wheel deflection. The broken line 70 denotes the normal static load of the suspension device, so that when the parts are in the positions shown in Figure 1 the operating point on the graph is indicated at 71. The part 72 of the curve represents the characteristic when the device is shortened from the position shown in Figure 1, for in these circumstances the auxiliary spring 65 is inoperative and the main spring 13 works alone without any substantial damping; in other words the line 72 (together with its extension 72a) represents the characteristic of the main spring 13. At the other side of the point 71 the line 73 represents the extension of the suspension device with both of the springs 13 and 65 acting to absorb a road shock. The end of the extension movement occurs at 74, whereupon the load diminishes suddenly to the point 75 owing to the resistance to movement offered by the liquid within the space 35, said resistance cancelling out a part of the force of the main spring 13 represented by the distance f. As the recoil stroke takes place, however, this cancelled force diminishes progressively, owing to the reduced force exerted on the recoil valve 36 by the auxiliary spring 65, so that the part 76 of the working curve can be made approximately horizontal or can even be made to ascend, as shown in Figure 4, with a view to reducing the upward thrust on the vehicle body to a minimum during the recoil.

The improved form of suspension device is capable of being modified in design to produce a large variety of operating characteristics, primarily by varying the relative areas of the annular valve member in relation to the cross-section of the cylinder bore and the strength of the auxiliary spring by comparison with that of the main spring.

The arrangement which has been described is given merely by way of example and numerous modifications are possible to suit requirements. For instance, the unit may be mounted in various ways, depending upon the space available and the form of movement which the wheel or equivalent ground-contacting element is desired to make, while it is possible to design the device so that it becomes stressed by a compressing movement. Moreover it may be desirable in some cases for the main spring to be incorporated in the damping unit, for example by being arranged to surround the cylinder of said unit. Further, the improved form of damping unit may be employed in conjunction with various types and constructions of resilient vehicle suspension device, such, for instance, as those employing elliptic or part-elliptic springs or torsion bars, one end of the damping unit in each case being connected to the wheel or equivalent and the other end to the vehicle chassis or body.

What I claim is:

1. For use in conjunction with a vehicle suspension spring, a damping unit comprising a cylinder containing damping liquid; a piston device mounted to reciprocate within the cylinder as the loading of the vehicle spring increases and decreases, said piston including a non-return recoil valve arranged to by-pass the piston in one direction; means for by-passing the piston in the opposite direction; and an auxiliary coiled compression spring which is disposed within one end of the cylinder and is arranged to be engaged by the recoil valve, and to be compressed when the vehicle suspension spring is stressed beyond its normal static loading due to a road shock, the compressed auxiliary spring thereby holding the by-pass valve closed until the recoil of the vehicle suspension spring generates in the liquid in the other end of the cylinder, a pressure sufficient to open the recoil valve against the force exerted by the auxiliary spring.

2. A damping unit as claimed in claim 1, wherein the piston device comprises a head formed upon a piston rod, which latter is slidable through the end wall of the cylinder, and wherein the recoil valve includes an annular member slidably engaging with the cylinder wall, said annular member being arranged to seat upon the head of the piston device and to form therewith a substantially liquid-tight seal.

3. A damping unit as claimed in claim 1, wherein the piston device comprises a head formed upon a piston rod, which latter is slidable through the end wall of the cylinder, and wherein the recoil valve includes an annular member slidably engaging with the cylinder wall, said annular member being arranged to seat upon the head of the piston device and form therewith a substantially liquid-tight seal, and also being operatively interposed between the auxiliary spring and the head upon the piston rod.

4. A damping unit as claimed in claim 1, wherein the piston device comprises a head formed upon a piston rod, which latter is slidable through the end wall of the cylinder, and wherein the recoil valve includes an annular member slidably engaging with the cylinder wall, said annular member being arranged to seat upon the head and form a substantially liquid-tight seal, and also being slidable, within limits, on the piston rod.

5. A damping unit as claimed in claim 1, wherein a one-way valve is arranged to by-pass the piston device to allow liquid to flow freely past said device in the direction opposite to that permitted by the recoil valve.

6. A damping unit as claimed in claim 1, wherein the auxiliary spring is loosely interposed between the end wall of the cylinder and the recoil valve member, the natural free length of the spring being arranged so that said spring exerts no closing force on the said valve when the vehicle suspension spring is bearing its normal static load, an apertured partition disposed in the cylinder, a one-way valve controlling the passage of liquid through said partition, and a tubular stem connecting together the relatively remote sides of the piston device and the partition, said stem passing telescopically through said piston device.

7. For use in conjunction with a vehicle suspension spring, a damping unit comprising in combination a piston and a cylinder mounted to move telescopically as the loading of the vehicle spring increases and decreases, an auxiliary spring which is stressed by the relative movement of the piston and cylinder as the vehicle suspension spring is stressed beyond its normal loading due to road shock, liquid damping means restraining the recoil movement of the piston and cylinder due to the force created upon them by the stress in the auxiliary spring, and a recoil valve device which controls the action of the liquid damping means and is urged to its closed position by the auxiliary spring when the latter is in a stressed condition, said auxiliary spring being of the coiled compression type and being interposed loosely between the end wall of the cylinder and the recoil valve device, the natural free length of the spring being such that said spring exerts no closing force on the valve device when the vehicle suspension spring is bearing its normal static load.

8. A damping unit as claimed in claim 1 wherein the auxiliary spring is loosely interposed between the end wall of the cylinder and the recoil valve member, the natural free length of the spring being arranged so that said spring exerts no closing force on said valve when the vehicle suspension spring is bearing its normal static load, an apertured partition disposed in the cylinder, a one-way valve controlling the discharge of liquid through said partition, a tubular stem connecting together the spaces at the relatively remote sides of the piston and the partition, said stem passing telescopically through said piston, the space in said cylinder on the side of said partition remote from said piston having therein a floating piston, and means urging said floating piston toward said partition.

PETER WARBORN THORNHILL.